United States Patent
Jeong

(10) Patent No.: US 8,107,980 B2
(45) Date of Patent: Jan. 31, 2012

(54) TRANSMITTING AND RECEIVING OF SMS MESSAGES USING A MOBILE TERMINAL TO/FROM A FOREIGN COUNTRY

(75) Inventor: Sung Hak Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 12/404,721

(22) Filed: Mar. 16, 2009

(65) Prior Publication Data

US 2010/0137009 A1    Jun. 3, 2010

(30) Foreign Application Priority Data

Nov. 28, 2008  (KR) ......................... 10-2008-0119639

(51) Int. Cl.
*H04W 4/12* (2009.01)
*H04W 4/14* (2009.01)
*H04L 29/08* (2006.01)
*G06F 3/041* (2006.01)
*G08B 1/08* (2006.01)

(52) U.S. Cl. ................... 455/466; 455/414.4; 455/456.3; 455/517; 455/550.1; 455/412.1; 709/206; 709/207; 707/912; 707/922; 340/539.23; 715/856; 715/862; 715/864; 715/700; 345/173

(58) Field of Classification Search ............... 455/412.1, 455/466; 379/68
See application file for complete search history.

(56) References Cited

FOREIGN PATENT DOCUMENTS
WO    WO 2007/105893 A1 *  9/2007

OTHER PUBLICATIONS

Short Message Peer-to-Peer Protocol Specification Version 5.0; Published: Feb. 19, 2003; obtained from www.smsforum.net.*

* cited by examiner

*Primary Examiner* — Dwayne Bost
*Assistant Examiner* — Nalini Yerneni
(74) *Attorney, Agent, or Firm* — Birch, Stewart, Kolasch & Birch, LLP

(57) ABSTRACT

A mobile terminal according to the present invention includes an input unit for receiving data required to transmit a short message service (SMS) message and a controller for coding user data recorded in the SMS message in conformity with a text coding standard adopted by a second country according to the data when the SMS message is not transmitted to a network of a first country to which the mobile terminal is currently connected and is delivered to a network of the second country.

5 Claims, 8 Drawing Sheets

TRANSMITTING AND RECEIVING OF SMS MESSAGES USING A MOBILE TERMINAL TO/FROM A FOREIGN COUNTRY

CROSS-REFERENCE TO RELATED APPLICATIONS

This application claims the benefit of Korea Patent Application No. 10-2008-0119639 filed on Nov. 28, 2008, which is incorporated herein by reference for all purposes as if fully set forth herein.

BACKGROUND OF THE INVENTION

The present invention relates to transmitting and receiving of SMS (Short Message Service) messages using a mobile terminal.

SMS messages are transmitted and received according to SMS that is an additional cellular phone service and transmits text data in the form of a short message composed of letters and/or figures.

With the development of mobile communication standard into the third generation, worldwide standardization is performed for 3GPP (3ard Generation Partnership Project), for example, and thus mobile communication between different countries can be achieved.

In the case of SMS, however, a method of coding/decoding a text forming an SMS message and a method of designating the coding/decoding method are varied according to the country where the SMS is used and the mobile telecommunication service provider providing the SMS.

SUMMARY OF THE INVENTION

It is an object of the present invention to provide a mobile terminal capable of transmitting/receiving SMS messages to/from a foreign country and an SMS message transmitting/receiving method thereof.

According to a first aspect of the present invention, there is provided a mobile terminal comprising an input unit for receiving data required to transmit an SMS message and a controller for coding user data recorded in the SMS message in conformity with a text coding standard adopted by a second country according to the data when the SMS message is not transmitted to a network of a first country to which the mobile terminal is currently connected and is delivered to a network of the second country.

The controller may record information on a text coding standard adopted by the first country in an information field of the header of the SMS, which represents a text coding standard.

The data required to transmit the SMS message may include the number of a recipient that will receive the SMS message and the controller may confirm whether or not the SMS message is transmitted to the second country according to the number of the recipient.

The controller may code the user data recorded in the SMS message according to the text coding standard adopted by the first country when the SMS message is transmitted to the network of the first country.

The second country corresponds to Korea and the text coding standard adopted by the second country is KCS5601.

According to a second aspect of the present invention, there is provided a method comprising the steps of receiving data for transmitting an SMS message and coding user data recorded in the SMS message in conformity with a text coding standard adopted by a second country according to the data when the SMS message is not transmitted to a network of a first country to which the mobile terminal is currently connected and is delivered to a network of the second country.

The method may further comprise the step of recording information on a text coding standard adopted by the first country in an information field of the header of the SMS, which represents a text coding standard.

According to a third aspect of the present invention, there is provided a mobile terminal comprising a radio communication unit for receiving an SMS message and a controller for confirming whether a text stored in the user data region of the SMS message is written in the language of a specific country and decoding the text according to a text coding standard adopted by the specific country irrespective of information recorded in an information field of the header of the SMS message, which represents a text coding standard, when the text is written in the language of the specific country.

The controller may decode the text according to the information recorded in the information field representing the text coding standard when the text of the SMS message is not written in the language of the specific country.

The present invention can control a method of coding/decoding a text constructing an SMS message and a method of designating the coding/decoding method to enable transmission/receiving of SMS messages between different countries so as to provide a worldwide service.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
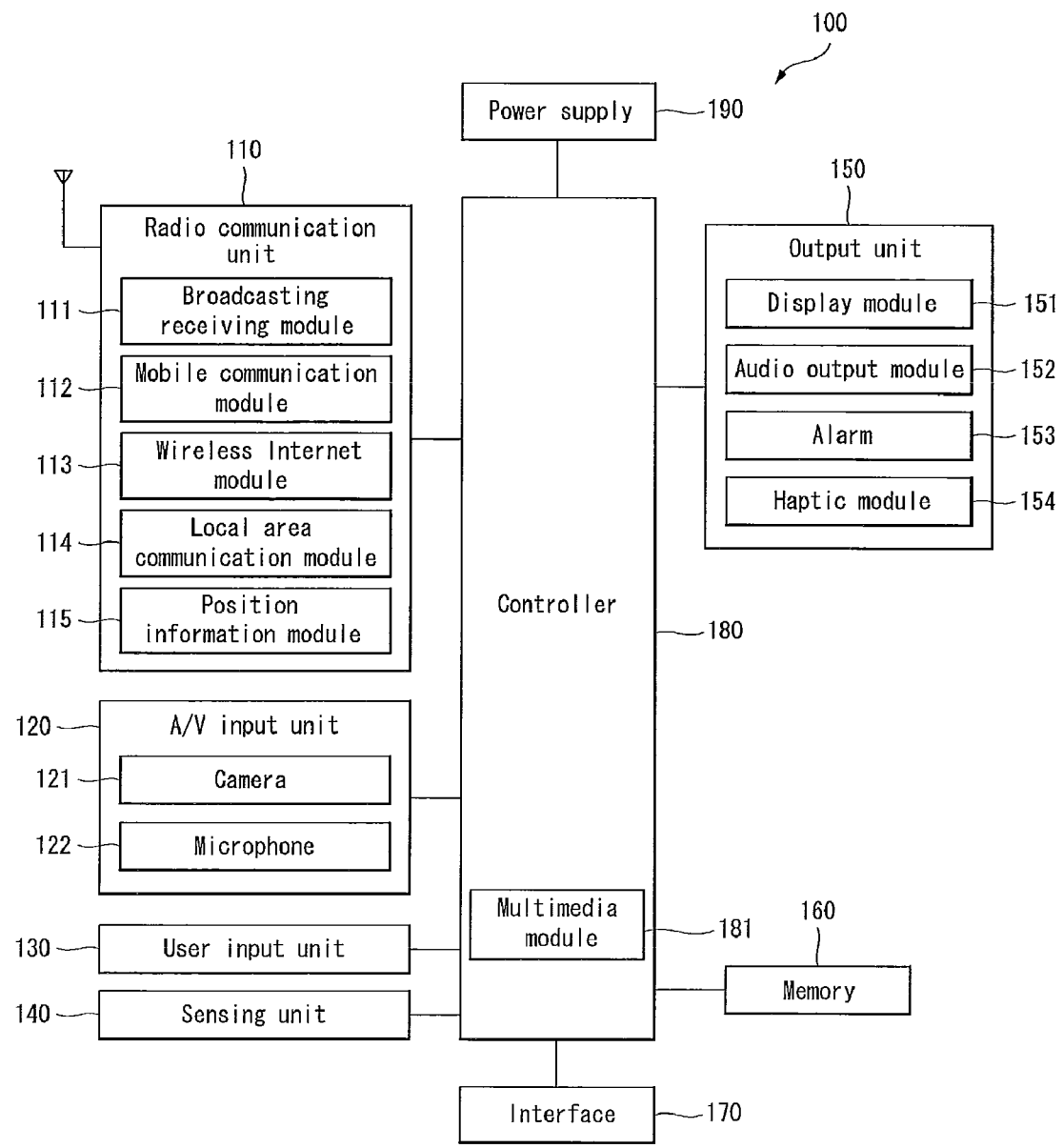
FIG. 1 is a block diagram of a mobile terminal according to an embodiment of the present invention.

FIG. 1 is a block diagram of a mobile terminal 100 according to an embodiment of the present invention.

The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of a combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages.

The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 corresponds to a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal 100. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact.

The proximity sensor has lifetime longer than that of a contact sensor and has wide application. The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bringing the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
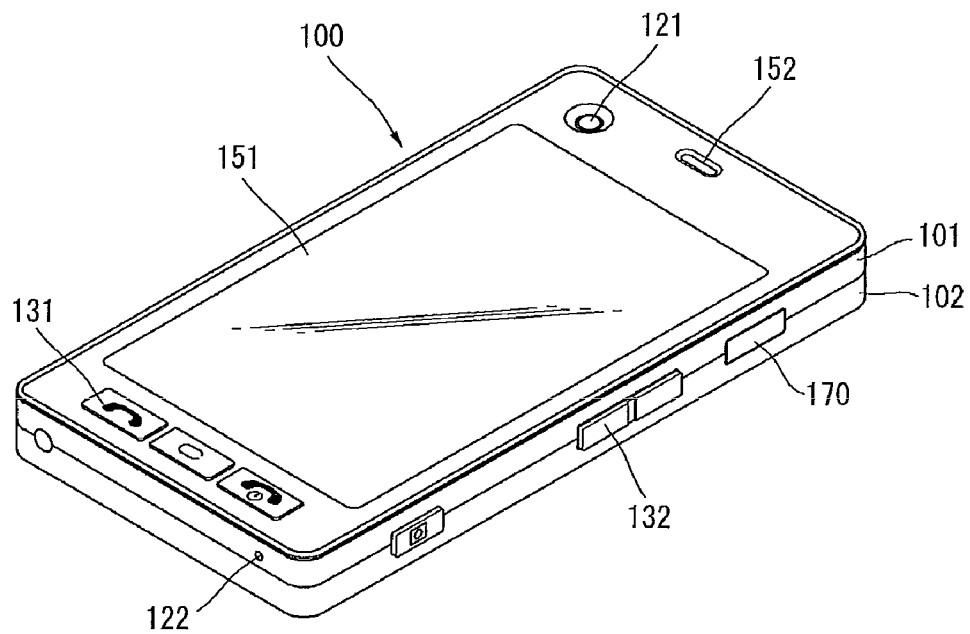
FIG. 2A is a front perspective view of a handheld terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 116 and 117 can receive various inputs. For example, the first operating unit 116 receives commands such as start, end and scroll and the second operating unit 117 receives commands such as control of the volume of sound output from the audio output unit 152 or conversion of the display unit 151 to a touch recognition mode.

Figure 2B:
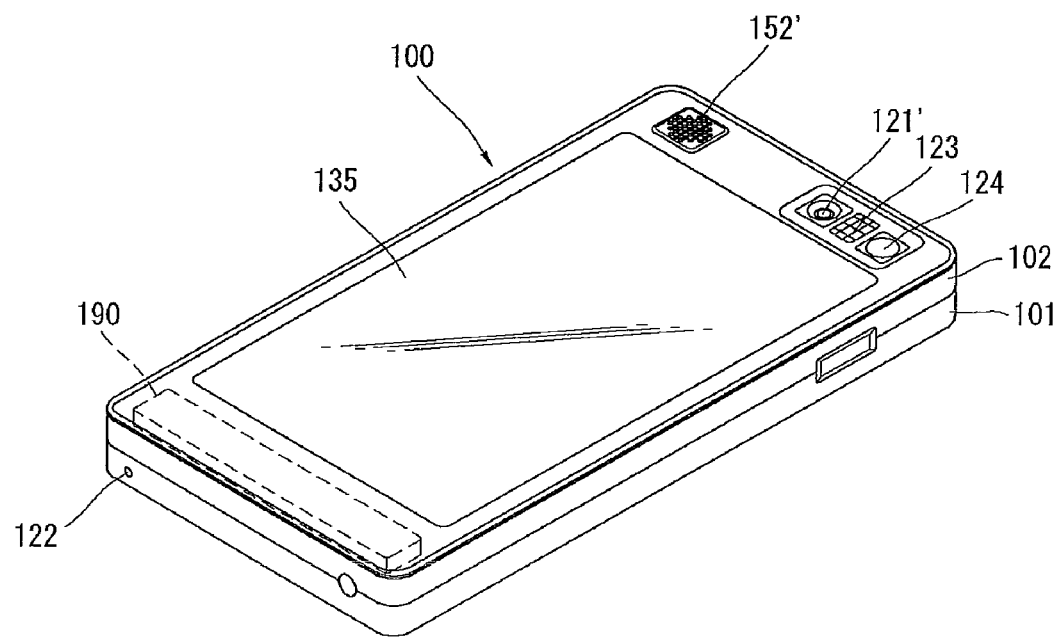
FIG. 2B is a rear perspective view of the handheld terminal according to an embodiment of the present invention.

FIG. 2B is a rear perspective view of the handheld terminal shown in FIG. 2A according to an embodiment of the present invention.

Referring to FIG. 2B, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Interoperations of the display unit 151 and the touch pad 135 will now be described with reference to FIGS. 3A and 3B.

Figure 3A:
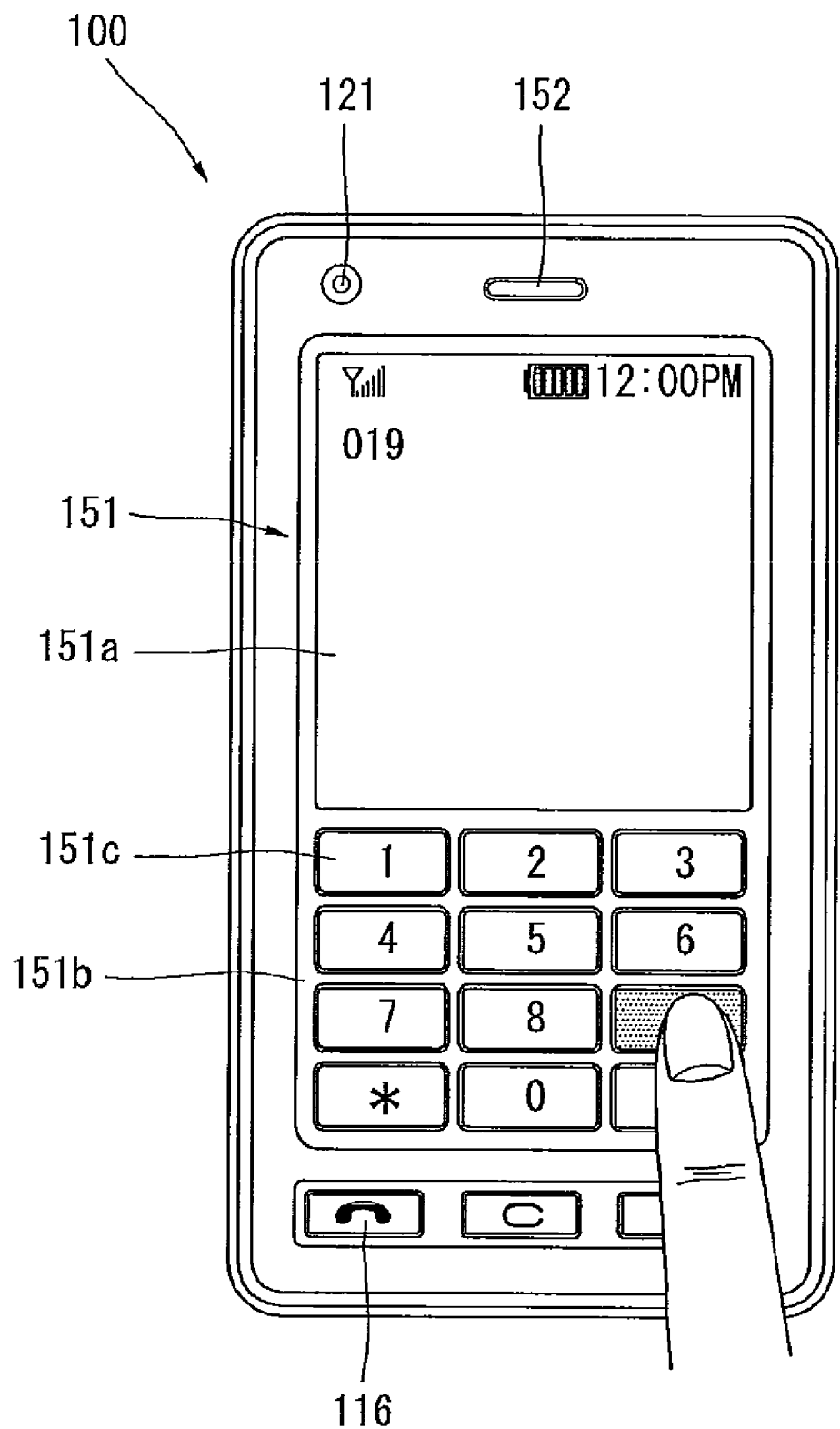
FIGS. 3A and 3B are front views of the handheld terminal for explaining an operation of the handheld terminal according to an embodiment of the present invention.
Figure 3B:
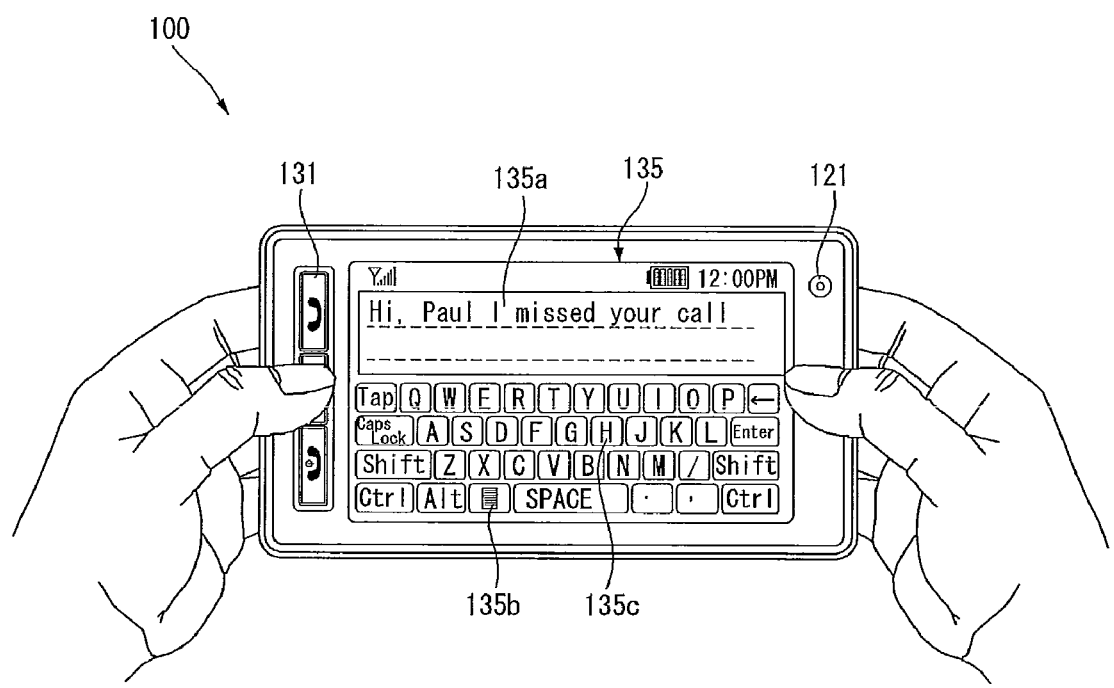

FIGS. 3A and 3B are front views of the handheld terminal 100 for explaining an operating state of the handheld terminal according to an embodiment of the present invention.

The display unit 151 can display various types of visual information in the form of characters, numerals, symbols, graphic or icons. To input the information, at least one of the characters, numerals, symbols, graphic and icons are displayed in predetermined arrangement in the form of a keypad. This keypad can be referred to as a 'soft key'.

FIG. 3A shows that touch applied to a soft key is input through the front side of the terminal body.

The display unit 151 can be operated through the overall area thereof. Otherwise, the display unit 151 can be divided into a plurality of regions and operated. In the latter case, the display unit 151 can be constructed such that the plurality of regions interoperate.

For example, an output window 151*a* and an input window 151*b* are respectively displayed in upper and lower parts of the display unit 151. The input window 151*b* displays soft keys 151*c* that represent numerals used to input numbers such as telephone numbers. When a soft key 151*c* is touched, a numeral corresponding to the touched soft key is displayed on the output window 151*a*. When the user operates the first operating unit 116, connection of a call corresponding to a telephone number displayed on the output window 151*a* is attempted.

FIG. 3B shows that touch applied to soft keys is input through the rear side of the terminal body. FIG. 3B shows the landscape of the terminal body while FIG. 3A shows the portrait of the terminal body. The display unit 151 can be constructed such that an output image is converted according to the direction in which the terminal body is located.

FIG. 3B shows the operation of the handheld terminal in a text input mode. The display unit 151 displays an output window 135*a* and an input window 135*b*. A plurality of soft keys 135*c* that indicate at least one of characters, symbols and numerals can be arranged in the input window 135*b*. The soft keys 135*c* can be arranged in the form of qwerty keys.

When soft keys 135*c* are touched through the touch pad 135, characters, numerals and symbols corresponding to the touched soft keys 135*c* are displayed on the output window 135*a*. Touch input through the touch pad 135 can prevent the soft keys 135*c* from being covered with user's fingers when the soft keys 135*c* are touched as compared to touch input through the display unit 151. When the display unit 151 and the touch pad 135 are transparent, fingers located behind the terminal body can be confirmed with the naked eye, and thus touch input can be performed more correctly.

The display unit 151 or the touch pad 135 can be constructed such that it receives touch input in a scroll manner. The user can scroll the display unit 151 or the touch pad 135 to move an object displayed on the display unit 151, for example, a cursor or a pointer located on an icon. Furthermore, when a finger moves on the display unit 151 or the touch pad 135, the finger moving path can be visually displayed on the display unit 151. This will be useful to edit an image displayed on the display unit 151.

For a case where the display unit 151 (touch screen) and the touch pad 135 are simultaneously touched in a predetermined period of time, a specific function of the terminal can be executed. The case can include a case that the user clamps the terminal body using the thumb and the index finger. The specific function can include activation or inactivation of the display unit 151 or the touch pad 135, for example.

The proximity sensor described with reference to FIG. 1 will now be explained in more detail with reference to FIG. 4.

Figure 4:
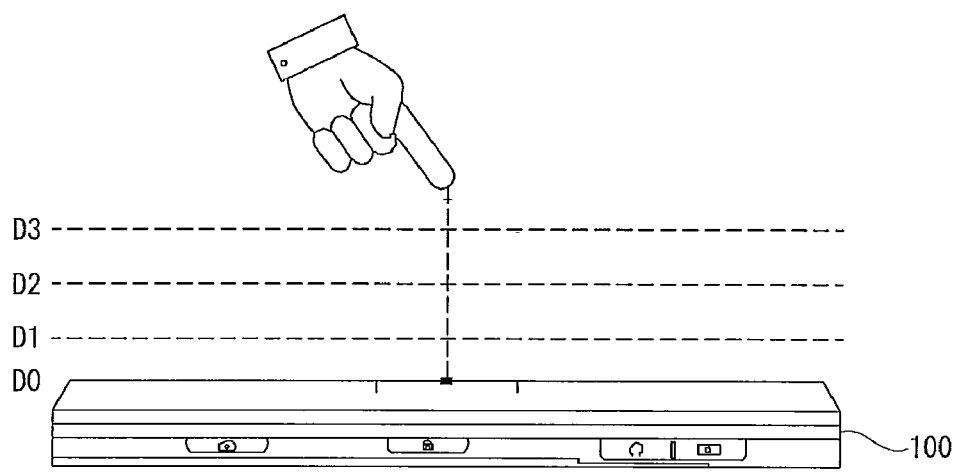
FIG. 4 is a conceptional view for explaining a proximity depth of a proximity sensor.

FIG. 4 is a conceptional view for explaining a proximity depth of the proximity sensor.

As shown in FIG. 4, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 4 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Embodiments of the present invention will be explained.

Figure 5:
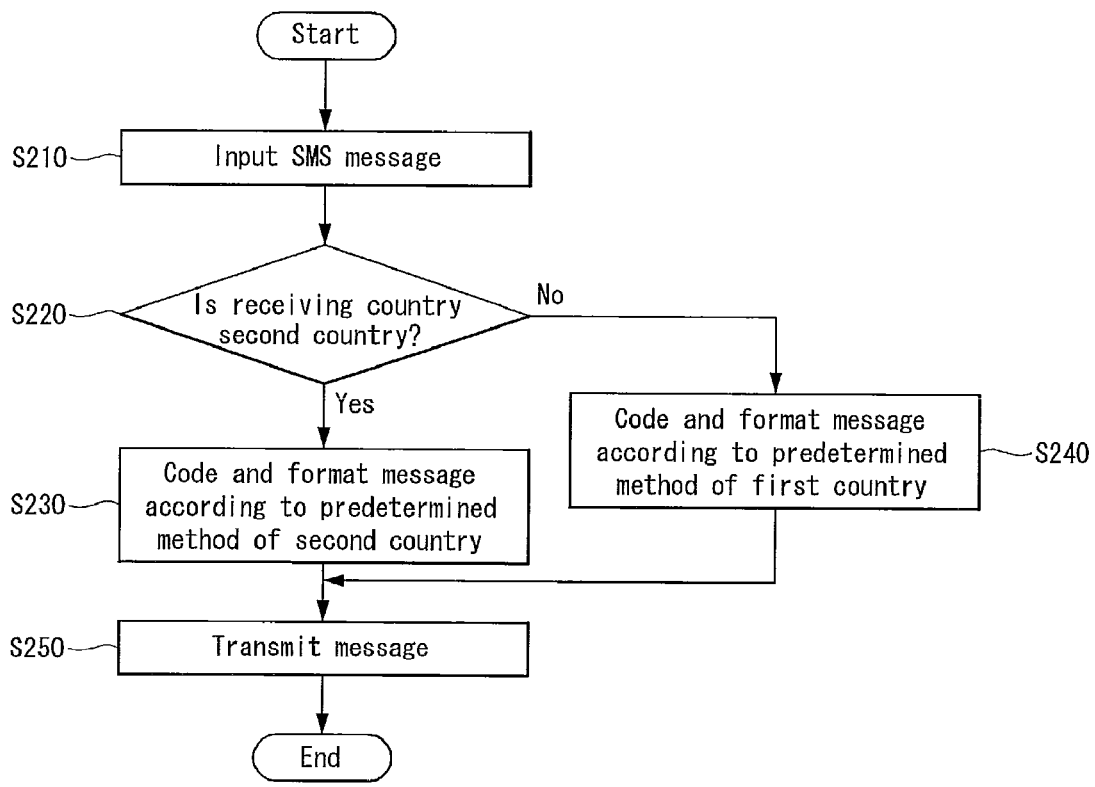
FIG. 5 is a flow chart illustrating a method of transmitting an SMS message according to an embodiment of the present invention.
Figure 6A:
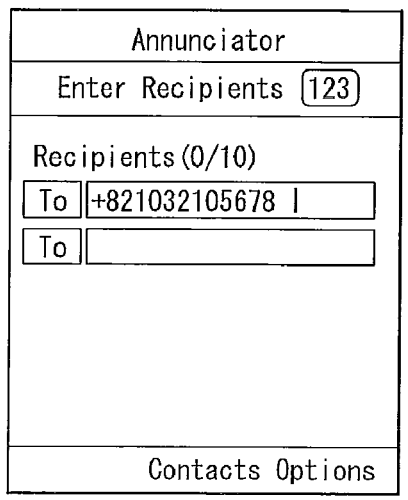
FIGS. 6A and 6B illustrate images displayed on a display unit of a mobile terminal when an SMS message is transmitted.
Figure 6B:
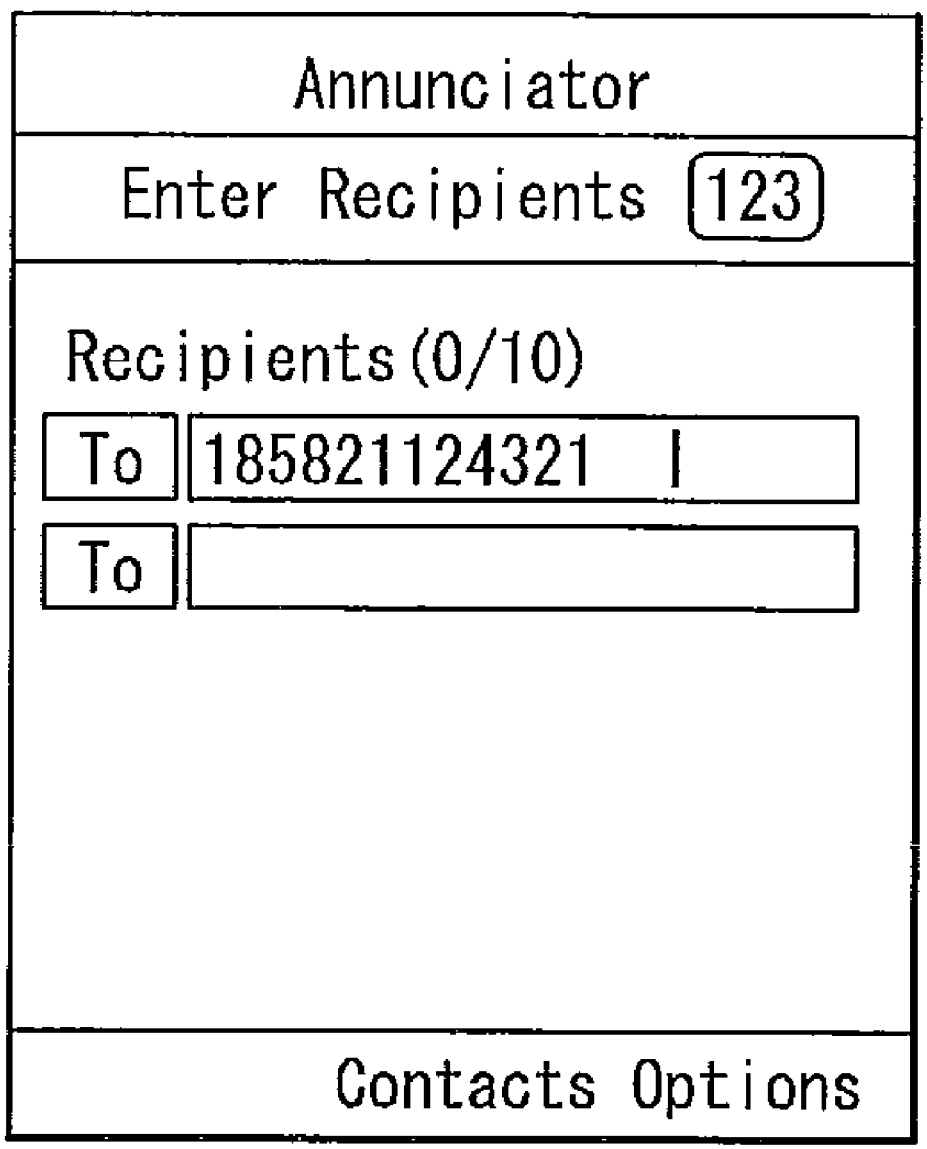
Figure 7:
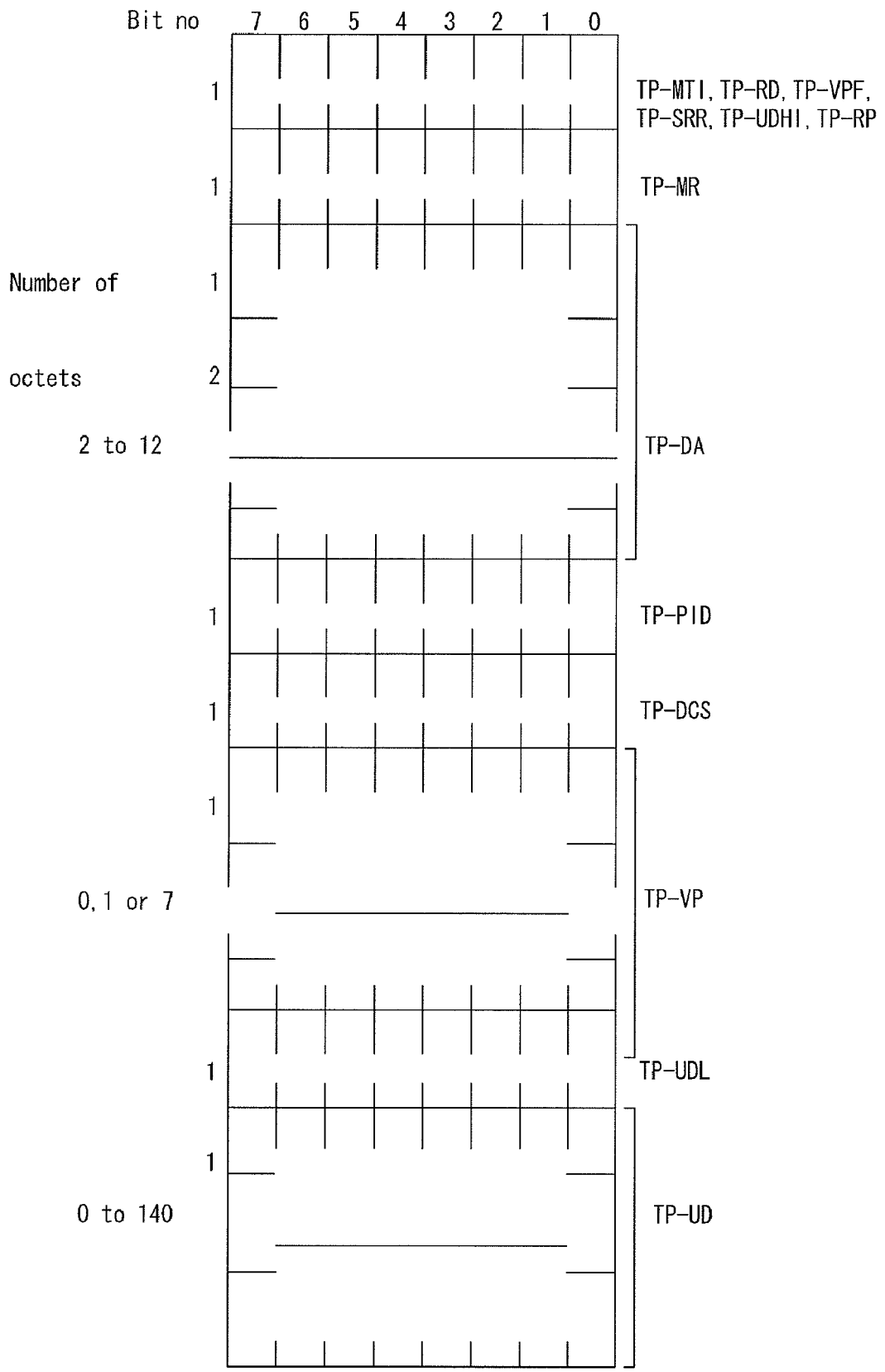
FIG. 7 is a view for explaining a format of an SMS message.

FIG. 5 is a flow chart illustrating a method of transmitting an SMS message using the mobile terminal 100 according to an embodiment of the present invention, FIGS. 6A and 6B illustrate images displayed on the display unit 151 of the mobile terminal 100 when an SMS message is generated and transmitted, and FIG. 7 illustrates an example of a format of an SMS message according to the present invention.

The method of transmitting an SMS message using the mobile terminal 100 and an operation of the mobile terminal 100 to perform the method according to an embodiment of the present invention will now be explained.

When an SMS message transmission function of the mobile terminal 100 is selected, data required to transmit an SMS message is selected and input through the user input unit 130 and applied to the controller 180 in operation S210.

Here, the data required to transmit an SMS message includes not only user data corresponding to the text contents of the SMS message but also data required to transmit the SMS message to a recipient, such as the number of the recipient receiving the SMS message.

The controller 180 confirms whether a country where the recipient is located is a first country including America, for example, or a second country including Korea, for example, based on the data in operation S220.

Referring to FIG. 6A, when a recipient's number input by a user to the mobile terminal in order to transmit an SMS message in America where an American common carrier provides a service starts with "+82", for example, this number is a nation number that designates Korea.

Referring to FIG. 6B, when the recipient's number input to the mobile terminal in America starts with "1", for example, the number designates America, and thus it can be known that a recipient's terminal corresponding to the recipient's number is not located in Korea.

That is, the controller 180 of the mobile terminal 100 can confirm not only whether the position of the recipient to which the SMS message will be transmitted is national or international but also the name of the country where the recipient is located when the position of the recipient is international through the recipient' number.

The controller 180 codes and formats the SMS message using a predetermined method according to the country confirmed through the recipient's number in operation S230 or S240.

That is, the controller 180 confirms whether the recipient's terminal is located in the second country such as Korea, for example, or the first country such as America, for example, based on the recipient's number, codes and formats the SMS message according to an SMS message coding standard and a message format of the corresponding country based on the confirmation result. Classification of the first country and the second country will be described later in detail.

FIG. 7 is a view for explaining an SMS message coding method and an SMS message format.

FIG. 7 shows an SMS message format according to 3GPP. The following table explains fields illustrated in FIG. 7 in detail.

TABLE 1

| Abbr. | Reference | P (note 1) | P (note 2) | Description |
|---|---|---|---|---|
| TP-MTI | TP-Message-Type-Indicator | M | 2b | Parameter describing the message type |
| TP-RD | TP-Reject-Duplicates | M | b | Parameter indicating whether or not the SC shall accept an SMS-SUBMIT for an SM still held in the SC which has the same TP-MR and the same TP-DA as a previously submitted SM from the same OA |
| TP-VPF | TP-Validity-Period-Format | M | 2b | Parameter indicating whether or not the TP-VP filed is present |
| TP-RP | TP-Reply-Path | M | b | Parameter indicating the request for reply path |
| TP-UDHI | TP-User-Data-Header-Indicator | O | b | Parameter indicating that the TP-UD field contains a header |

TABLE 1-continued

| Abbr. | Reference | P (note 1) | P (note 2) | Description |
|---|---|---|---|---|
| TP-SRR | TP-Status-Report-Request | O | B | Parameter indicating if the MS is requesting a status report |
| TP-MR | TP-Message-Reference | M | I | Parameter identifying the SMS-SUBMIT |
| TP-DA | TP-Destination-Address | M | 2-12o | Address of the destination SME |
| TP-PID | TP-Protocol-Identifier | M | b | Parameter identifying the above layer protocol, if any |
| TP-DCS | TP-Data-Coding-Scheme | M | I | Parameter identifying the coding scheme within the TP-User-Data |
| TP-VP | TP-Validity-Period | O | 2-12o | Parameter identifying the time from where the message is no longer valid |
| TP-UDL | TP-User-Data-Length | M | I | Parameter indicating the length of the TP-User-Data field to follow |
| TP-UD | TP-User-Data | O | (note 3) | |

1) Provision; Mandatory (M) or Optional (O)
2) Representation; Integer (I), bit (b), 2 bits (2b), Octet (o), 7 octets (7o), 2-12 octets (2-12o)
3) Dependent on the TP-DCS Referring to FIG. 7 and Table 1, the TP-DCS field designates a TP data coding scheme and stores a parameter indicating a coding scheme used for user data in the TP-UD field.

When a value (referred to as 'DCS value' hereinafter) stored in the TP-DCS is "00xx", this value represents GSM-7 bit, 8 bit data, and Unicode designated by 3GPP, which are general coding methods.

The 3GPP has reserved DCS values in order to designate coding methods other than the aforementioned coding methods, which are expected as upper four bit values of the TP-DCS field, 1000, 1001, 1010 and 1011.

In Korea, the Korean alphabet coding method for SMS messages does not employ the Unicode according to the international standard and adopts KSC5601 that is the Korean standard. Although common carriers has different "DCS values" for indicating the KSC5601 message coding method, the Korean alphabet coding method for SMS messages adopts KSC5601 and "0x84" among the reserved DCS values is used as "DCS value" to represent that the Korean alphabet coding method is KSC5601 according to the present Korean communication standard.

However, an America common carrier, for example, AT&T, can support only coding methods represented by values designated by 3GPP, such as GSM-7 bit, 8 bit data and Unicode, and does not support a coding method designated by using a reserved DCS value as "DCS value".

Accordingly, transmission of SMS messages coded through a coding method such as KSC5601, which is designated by using a reserved DCS value, are blocked in the internal network of AT&T, and thus the SMS messages cannot be transmitted to the outside of the network of AT&T.

Most countries adopt the Unicode as a method of coding user data of an SMS message and format the SMS message in such a manner that a "DCS value" for designating the coding method is represented by a value indicating the Unicode, which is designated by 3GPP. This coding method is used for French or Spanish and internationally popularly used.

Accordingly, when a country that adopt the Unicode as a coding method, that is, the first country, codes an SMS message through the Unicode and designates the Unicode by using a DCS value, the SMS message can be normally transmitted and received and the Korean alphabet can be normally decoded in the first country. However, when a country that does not adopt the Unicode as a coding method, that is, the second country such as Korea, receives the SMS message, the Korean alphabet is not normally decoded and cannot be recognized because the first and second countries have different coding methods.

Furthermore, if an SMS message is coded with KSC5601 and a DOS value is designated by using a reserved DCS value, the SMS message cannot be transmitted in a network provided by a common carrier, for example, AT&T of U.S., and thus transmission of the SMS message is blocked.

Accordingly, in the current embodiment of the present invention, a country that receives an SMS messages is identified according to a recipient's number and the text of the SMS message transmitted to the second country including Korea is coded through a text coding method according to the standard adopted by the second country when the identified country corresponds to the second country, as illustrated in FIG. 6A in operation S230. Here, the DCS value is designated by a method designated by the standard adapted by the first country, such as the Unicode.

In other words, when the DCS value of the DCS field, which designates a coding standard of user data recorded in a user data region of an SMS message, is represented in a manner designated by a standard adopted by the first country, such as the Unicode, although text data corresponding to the user data is coded according to a standard adopted by the second country, such as KSC5601, the method of actually coding the user data does not correspond to the coding method represented by the header of the SMS message, in which the user data is recorded.

Furthermore, since the DCS value is represented in the Unicode although the SMS message is coded through KSC5601, transmission of the SMS message is not blocked in the network of the first country such as America, and thus the SMS message can be transmitted to a recipient located in the second country such as Korea.

The user data of the SMS message constructed in the aforementioned manner may not be normally decoded when the SMS message is transmitted to a country that does not belong to the second country. However, the SMS message is transmitted to the second country and the second country can normally code the SMS message.

For example, a recipient's terminal located in the second country such as Korea is previously set such that the recipient's terminal codes the Korean alphabet included in user data stored in the TP-UD field corresponding to the user data region of the SMS message by using KSC5601 even though the DCS value of the SMS message designates the Unicode, and thus the text of the SMS message is decoded through KSC5601 and the Korean alphabet can be normally decoded.

When the country that receives the SMS message according to the recipient's number does not correspond to the second country including Korea, as illustrated in FIG. 6B, the text of the SMS message is coded in the Unicode and the DCS value designates the Unicode in operation S240.

Accordingly, the SMS message can be transmitted in a network that supports the Unicode and terminals manufactured by other manufacturers and connected to the network can normally decode the Korean alphabet, and thus compatibility between different terminals can be achieved.

Although countries that receive the SMS message according to the recipient's number are divided into the first country and the second country having different coding methods, it is exemplary and the countries can be classified into at least three country groups and the text of the SMS message can be coded by different text coding methods.

The controller 180 transmits the SMS message that has been coded and formatted according to the recipient's number as described above to a terminal corresponding to the recipient's number through the radio communication unit 110 in operation S250.

Figure 8:
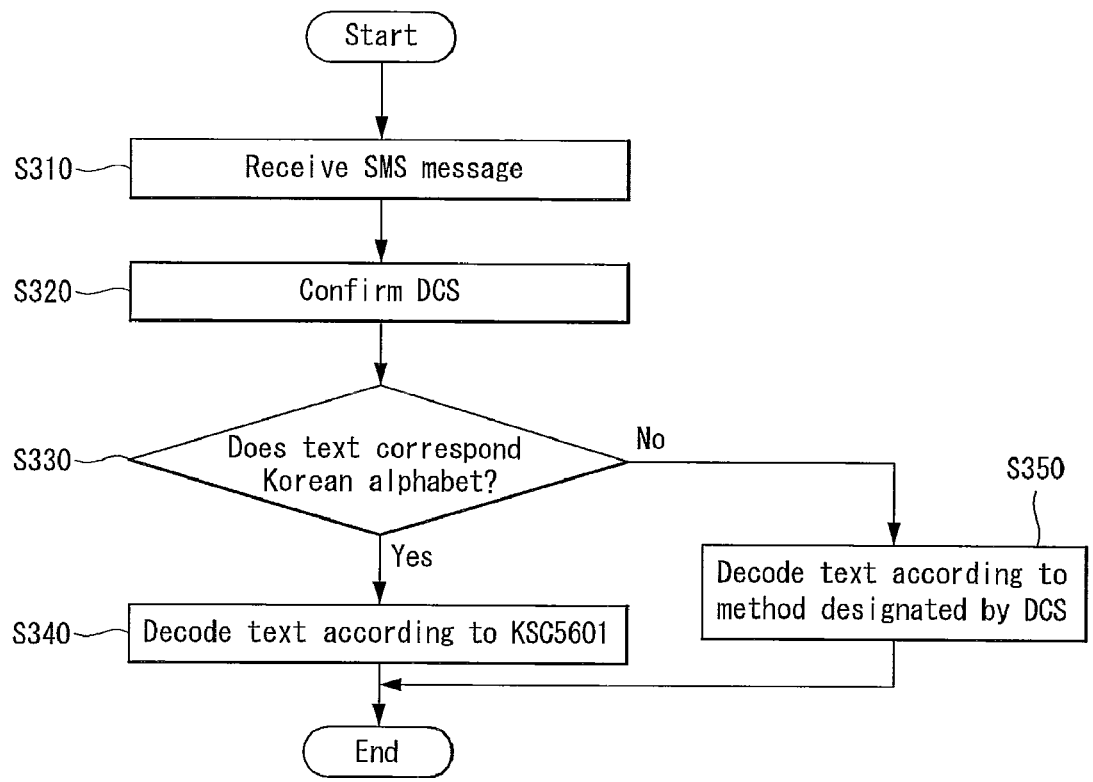
FIG. 8 is a flow chart illustrating a method of transmitting an SMS message according to another embodiment of the present invention.

FIG. 8 is a flow chart illustrating a user data decoding operation performed in the mobile terminal which receives an SMS message coded and formatted according to an embodiment of the present invention.

The controller 180 of the mobile terminal 100 receives the SMS message in operation S310 and confirms a DCS value of the TP-DCS field of the SMS message in operation S320.

Then, the controller 180 analyzes user data of the TP-UD field to confirm whether or not the text of the SMS message corresponds to the Korean alphabet in operation S330 and decodes the text according to KSC5601 when the text corresponds to the Korean alphabet in operation S340.

That is, text data stored in the user data region of the SMS message is decoded according to KSC5601 although a text coding method recorded in the DCS field of the header of the SMS message is designated to the Unicode.

When the text stored in the TP-UD field does not correspond to the Korean alphabet, however, the controller 180 may decode the text by using a coding method designated by the DCS value of the TP-UD field in operation S350. Accordingly, the controller 180 can decode the text according to the Unicode if the DCS value designates the Unicode when the text is written in English.

Therefore, a recipient located in a network of the second country can normally decode a Korean text included in an SMS message transmitted from a network of the first country.

When the network of the first country supports the use of reserved DCS values, a text in the language of the second country, such as Korean, can be coded by using a unique coding method of the second country, such as KSC5601, and a reserved DCS value that designates a coding method of a country, such as "0x84", can be recorded as a DCS value in the TP-DCS field to code and format an SMS message.

The above-described SMS message transmitting/receiving method using a mobile terminal according to the present invention can be written as computer programs in a computer readable recording medium.

The SMS message transmitting/receiving method using a mobile terminal according to the present invention can be executed through software. In this case, the elements of the present invention are code segments to perform the necessary tasks. The program or code segments can be stored in a processor readable medium or transmitted by a computer data signals embodied in a carrier wave over a transmission medium or communication link.

The computer readable recording medium is any data storage device that can store data which can be thereafter read by a computer system. Examples of the computer readable recording medium include read-only memory (ROM), random-access memory (RAM), CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising;
   an input unit configured to receive data input for transmitting of a short message service (SMS) message; and
   a controller configured to identify, based on a phone number of an intended recipient of the SMS message, if the SMS message is not to be transmitted to a network of a first country to which the mobile terminal is currently connected and to be delivered to a network of a second country based on the received data and further configured to code user data to be included into the SMS message in conformity with a text coding standard adopted by the second country while including a data coding scheme (DCS) value in an SMS header corresponding to a different text coding standard adopted by the first country so as to avoid a blocked transmission of the SMS by the network of the first country.

2. The mobile terminal of claim 1, wherein the second country corresponds to Korea and the text coding standard adopted by the second country is KCS5601.

3. A method for communicating by a mobile terminal, the method comprising the steps of:
   receiving, by the mobile terminal, data input for transmitting an SMS message;
   identifying, by the mobile terminal, if the SMS message is not to be transmitted to a network of a first country to which a mobile terminal to send the SMS message is currently connected and to be delivered to a network of a second country based on the received data; and coding, by the mobile terminal, user data to be included in the SMS message in conformity with a text coding standard adopted by the second country while including a data coding scheme (DCS) value in an SMS header corresponding to a different text coding standard adopted by the first country so as to avoid a blocked transmission of the SMS by the network of the first country.

4. The method of claim 3, wherein the second country corresponds to Korea and the text coding standard adopted by the second country is KCS5601.

5. A mobile terminal, comprising:
a controller configured to receive, while in a second country, a SMS message from a first country and decode user data included in the SMS message in conformity with a text coding standard adopted by the second country when a data coding scheme (DCS) value in header of the SMS corresponds to a different text coding standard adopted by the first country.

* * * * *